No. 685,569. Patented Oct. 29, 1901.
J. H. BULLARD.
GRADOMETER.
(Application filed May 21, 1901.)
(No Model.)

Witnesses:
J. W. Garfield
K. D. Clemons

Inventor:
James H. Bullard
by Chapin & Co.
Attorneys.

UNITED STATES PATENT OFFICE.

JAMES H. BULLARD, OF SPRINGFIELD, MASSACHUSETTS, ASSIGNOR TO OVERMAN AUTOMOBILE COMPANY, OF CHICOPEE, MASSACHUSETTS, A CORPORATION OF MASSACHUSETTS.

GRADOMETER.

SPECIFICATION forming part of Letters Patent No. 685,569, dated October 29, 1901.

Application filed May 21, 1901. Serial No. 61,286. (No model.)

*To all whom it may concern:*

Be it known that I, JAMES H. BULLARD, a citizen of the United States of America, residing at Springfield, in the county of Hampden and State of Massachusetts, have invented new and useful Improvements in Gradometers, of which the following is a specification.

This invention relates to gradometers, and has for its object the construction of an instrument of this class adapted especially to use on self-propelled vehicles.

It is well known that the bodies of motor-vehicles when in motion are subject to strong and rapid vibration, due in part to the action of their propelling mechanism and in part to the use thereon for obvious reasons of wheels having relatively small diameters. The lightness of the construction of these vehicles also somewhat enhances these vibrations. The application of a gradometer as ordinarily constructed to one of these vehicles is practically useless, for the indicating-bubble under the effects of the vibratory movements of the vehicles is so unsteady as to render its reading both difficult and unreliable. By means of this invention the indicating member is restrained in its movements and the reading of the gradometer may be quickly and accurately made at all times, regardless of the condition of the road or speed of the vehicle.

Figure 1:
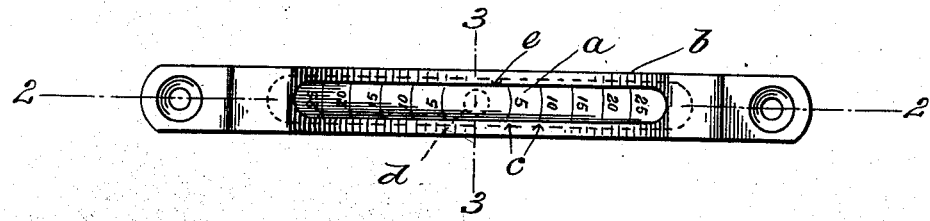
Figure 2:
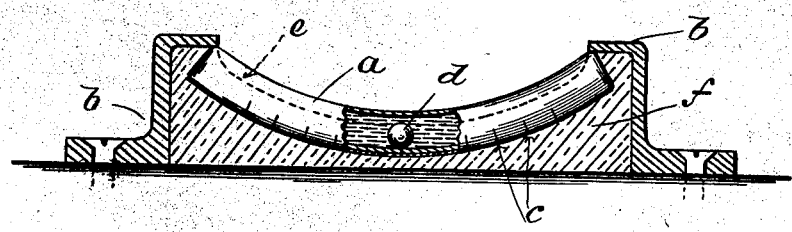
Figure 3:
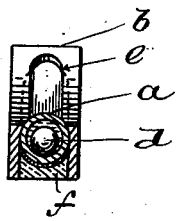

In the drawings forming part of this specification, Figure 1 is a plan view of a gradometer embodying my invention, and Fig. 2 is a side elevation of the same, partly in section, taken on line 2 2, Fig. 1. Fig. 3 is a cross-section of Fig. 1 on line 3 3.

In carrying out my invention I make use of the usual curved glass tube $a$, mounted in a metal frame $b$, and starting from its center, which is its lowest point, is provided with graduation-marks $c$, indicating the per cent. of inclination of the device relative to the horizen when the indicating member $d$ rests on one of said marks. The tube $a$ is filled with some non-freezing liquid, such as alcohol, and the indicating member $d$, consisting of a metal ball, is inserted therein and the ends of the tube then sealed in any convenient way. If it is desired that the movements of the member $d$ in the tube shall take place against a considerable resistance, said member is made of such diameter as to almost fill the bore of the tube, and the liquid medium in which it moves may be, if desired, thickened with some substance like glycerin.

When constructed as above described, it is apparent that as the device is inclined from the horizontal the member $d$ will by gravity seek the lowest point in the tube $a$; but it can only move in said tube as fast as permitted by the passage of a portion of the liquid on one side of it to the other side through the space left between the periphery of the member $d$ and the bore of the tube. If that space is of small area, the member $d$ will travel more slowly from point to point in the tube than if it were larger, and it is thus possible to so control the movements of the indicating member that it will not move with every vibration to which the vehicle-body on which it is supported is subjected.

To secure the tube $a$ in the frame $b$, I prefer to construct the latter, as shown, in the form of a box having an opening $e$ in the upper side thereof of less width than the external diameter of the tube and a little shorter than the length of the latter and inverting the frame place the tube therein with its ends resting on the frame, as shown in Fig. 1, then filling in the interior of the latter with plaster-of-paris or other suitable cement, (indicated by $f$.) The frame may then be secured to the vehicle-body in any position within sight of the operator of the vehicle.

To insure the proper operation of the device, it is obvious that the indicating member $d$ must be of a specific gravity relatively great as compared with the medium in which it is immersed and must be of a true spherical shape, and I find that a steel ball moving in a medium of pure alcohol gives the most satisfactory results.

Having thus described my invention, what I claim, and desire to secure by Letters Patent of the United States, is—

In a gradometer, a glass tube formed on the arc of a circle, and having sealed ends, a transparent liquid filling said tube, graduation-marks on the latter, and a metal ball in the tube, whose diameter closely approximates that of the bore of the tube, whereby the movements of the ball therein may be controlled, substantially as described.

JAMES H. BULLARD.

Witnesses:
 WM. H. CHAPIN,
 K. I. CLEMONS.